J-K FLIP-FLOP

Filed June 23, 1966

INVENTORS
Philip B. Foster
Richard A. Gissel
Walter C. Seelbach
ATTY'S.

INVENTORS
Philip B. Foster
Richard A. Gissel
Walter C. Seelbach
Mueller, Aichele & Rauner
ATTY'S.

United States Patent Office 3,444,395
Patented May 13, 1969

3,444,395
J-K FLIP-FLOP

Philip B. Foster, Phoenix, Richard A. Gissel, Tempe, and Walter C. Seelbach, Scottsdale, Ariz., assignors to Motorola, Inc., Franklin Park, Ill., a corporation of Illinois Filed June 23, 1966, Ser. No. 559,820
Int. Cl. H03k 3/26
U.S. Cl. 307—291 8 Claims

ABSTRACT OF THE DISCLOSURE

A J-K flip-flop having a set-reset bistable element including set and reset input terminals for receiving binary logic signals. A first capacitor couples binary logic signals to the set input terminal and a second capacitor couples binary signals to the reset input terminal. These first and second capacitors charge to different levels of voltage as the set-reset bistable element is switched from one conductive state to another. First and second current sources are connected respectively to the first and second capacitors and these current sources are biased by internal flip-flop voltages to rapidly discharge the first and second capacitors during J-K operation and thereby greatly increase the switching speed of the circuit.

This invention relates generally to bistable flip-flops of the type which have no indeterminate state for any binary logic input signal condition. These flip-flops are known in the computer art as J-K flip-flops, and the J-K function provided by these flip-flops is that of insuring that the flip-flop will have a determinate state when two identical binary switching signals (binary "ONES" using positive logic) at voltage levels sufficiently high to change the state of the flip-flop are simultaneously applied to the J and K inputs of the flip-flop.

In application Ser. No. 402,388, now Patent No. 3,351,778 of W. C. Seelbach et al. which is assigned to the assignee of the present application, there is disclosed and claimed a J-K flip-flop including a set-reset (RS) portion and capacitance storage means connected between the RS portion and a source of logic signals in a circuit configuration that will insure proper J-K operation. The invention to be described herein provides additional novel improvements in the circuitry described in the aforementioned Seelbach et al. application and these improvements provide high speed toggling never before realized in the operation of known J-K flip-flops.

Accordingly, it is an object of this invention to provide an improved J-K flip-flop circuit for use in high speed digital logic circuits.

It is another object of this invention to provide an improved flip-flop circuit which is particularly adapted to emitter coupled integrated circuit construction.

It is a further object of this invention to provide an improved J-K flip-flop circuit having excellent temperature tracking capabilities.

A feature of this invention is the provision of a pair of current source transistors connected respectively to a pair of input capacitors, the latter components coupling the J and K input information to the flip-flop. These current source transistors are alternately biased into conduction to provide a rapid discharge of these input coupling capacitors once the J and K binary information has been shifted into the flip-flop.

Another feature of this invention is the provision of a pair of lock-out transistors which render the coupling capacitors insensitive to clock signal transitions in the non-set mode of the flip-flop.

Figure 1:
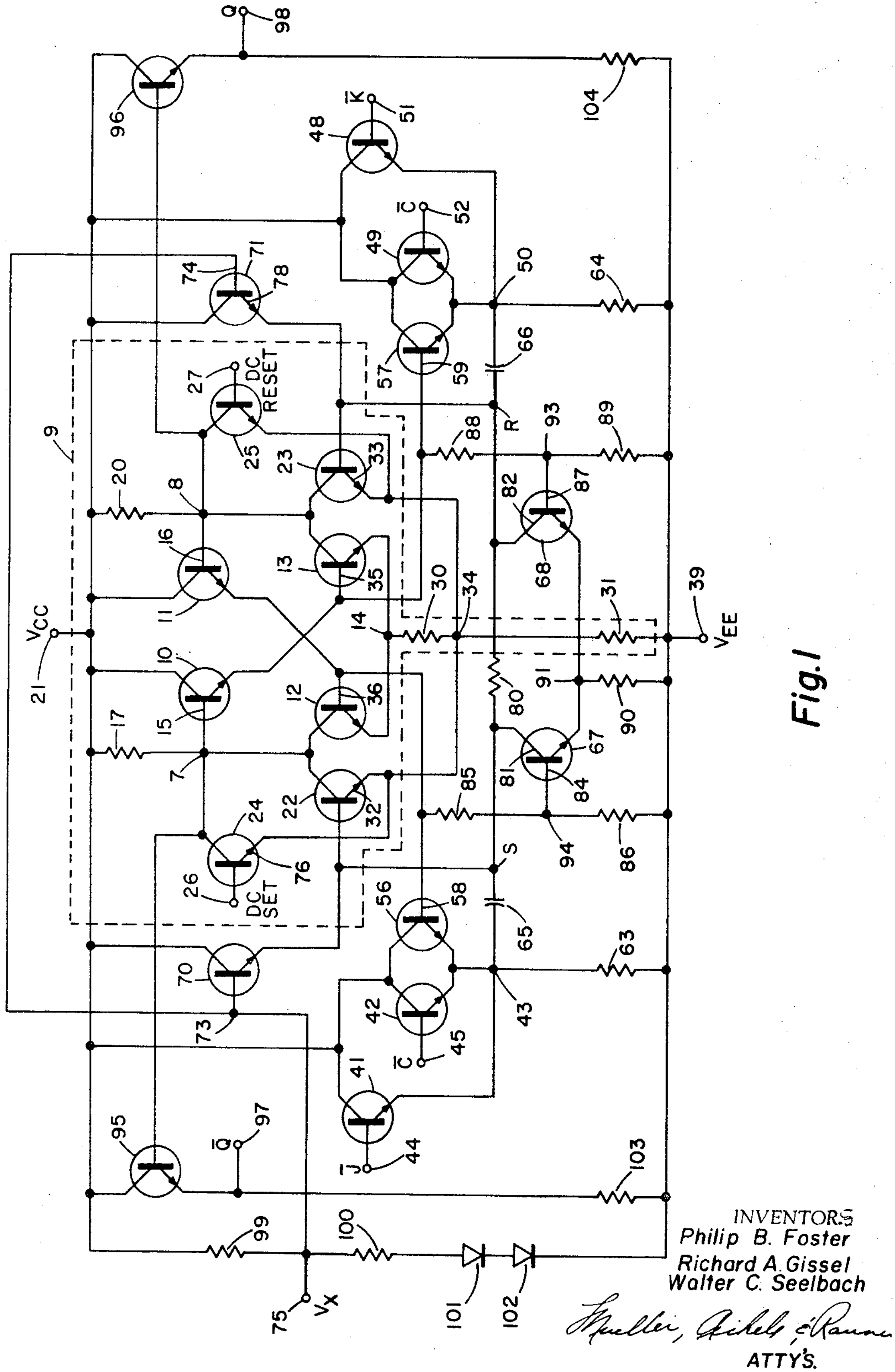

These and other objects and features will become more fully apparent in the following description of the accompanying drawing wherein:

FIG. 1 is a schematic diagram of the J-K flip-flop according to the present invention, and FIGS 2A to 2F are waveform diagrams of time-varying voltages at various points in the flip-flop circuit of FIG. 1.

Briefly, the J-K flip-flop according to this invention includes a set-reset flip-flop portion having first and second signal output transistor portions and first and second holding transistor portions, with circuitry cross-coupling the signal output and holding transistors to provide a current path for bistable multivibrator operation. J and K input circuits are connected via first and second input coupling capacitors to the set-reset flip-flop portion, and first and second current source transistors are connected respectively to the first and second input coupling capacitors to rapidly discharge same once the J and K binary information is shifted into the set-reset portion of the flip-flop. First and second lock-out transistors are connected to the J and K input circuits and insure that the first and second input capacitors will not build up excessive charge in the non-set mode of the flip-flop.

Referring in somewhat more detail to the drawing, there is shown in the schematic diagram in FIG. 1 a basic set-reset portion 9 which is described in detail in copending application Ser. No. 363, 959, now Patent No. 3,317,750 of J. A. Narud et al. and assigned to the assignee of the present application. This RS flip-flop portion 9 is also a basic component of the aforementioned Seelbach et al. application, and will be described briefly here in order to insure a more complete understanding of the J-K flip-flop according to the present invention.

The RS flip-flop portion 9 includes first and second emitter-follower transistors 10 and 11 directly cross-coupled to a pair of holding or latch back transistors 12 and 13. It will be apparent in the following description of the RS flip-flop portion 9 that the first and second holding transistors 12 and 13 will be alternately biased into conduction as the RS flip-flop 9 is alternately switched between its two stable states.

The holding transistors 12 and 13 are connected at a common output point 14 and the bases 15 and 16 respectively of the first and second emitter follower transistors 10 and 11 are connected through resistors 17 and 20 to a collector potential $V_{CC}$ at terminal 21. For purposes of illustration, it will be assumed that terminal 21 is at ground potential and that the emitter biasing potential $V_{EE}$ at terminal 39 is −5.2 volts.

The RS flip-flop portion 9 further includes set and reset circuit means comprising transistors 22 and 23 connected as shown to the first and second holding transistors 12 and 13 respectively. The set and reset input circuit means furthed includes DC set and DC reset transistors 24 and 25 having their collector-to-emitter path connected directly in parallel with transistors 22 and 23. The transistors 24 and 25 are connectable at base terminals 26 and 27 respectively to DC voltages for changing the state of the RS flip-flop 9 independently of the J and K input information.

A bias circuit means including resistors 30 and 31 is connected between the emitter supply $V_{EE}$ and the common output 14, and the emitter electrodes 32 and 33 of transistors 22 and 23 respectively are connected to an intermediate point 34 between resistors 30 and 31.

The operation of the RS flip-flop portion 9 is described in detail in the aforementioned copending Narud et al. application Ser. No. 363,959 and will be reviewed briefly at this point. Assume that the RS flip-flop is originally in its set state with the second holding transistor 13 conducting and with the first holding transistor 12 non-conducting. A zero voltage on the base 15 of transistor 10 produces a voltage of approximately −0.7 volt on its emitter due to the offset voltage of the transistor. Similarly, there is a voltage of approximately −0.8 volt on the base 16 of transistor 11 and −1.5 volts on its emitter. The values of resistors 30 and 31 are selected such that the voltage at the intermediate point 34 is approximately −1.8 volts and the voltage at the common output point 14 for holding transistors 12 and 13 is approximately −1.5 volts.

If now the voltage at point S swings from −1.3 volts (the level at point S when holding transistor 12 is non-conducting and when holding transistor 13 is conducting) toward ground potential the transistor 22 will become forward biased when point S reaches −1.1 volts. With −1.1 volts at point S transistors 22 and 13 will be equally forward biased by 0.7 volt and will carry equal currents. However, as the negative potential at point S decreases further, transistor 22 will be overdriven and holding transistors 12 and 13 will become non-conducting. Therefore, it can be seen that the voltage level at point S must reach a predetermined negative potential before the RS flip-flop 9 will begin to change its conductive state, and this feature provides the desired noise immunity characteristic in the above described RS flip-flop circuit.

As the negative potential at point S falls below −1.1 volts, the transistor 22 is overdriven and hogs the current flowing in flip-flop section 9. The current flowing through resistor 17 into the collector of transistor 22 will cause the voltage at the base 15 of emitter-follower 10 to drop to −0.8 volt and this voltage transition will be coupled through transistor 10 to the base electrode 35 of the second holding transistor 13. The voltage at base electrode 35 will now drop to −1.5 volts due to the offset voltage of emitter-follower transistor 10. As the second holding transistor 13 turns off, the voltage at base electrode 16 of emitter-follower 11 rises to zero volt and the voltage at the base electrode 36 of first holding transistor 12 rises from −1.5 volts to −0.7 volt.

As the voltage level at point S returns to the −1.1 volt level, the first holding transistor 12 "catches" and holds the flip-flop circuit 9 in its reset state. Again, when the voltage level at point S is −1.1 volts, transistors 22 and 12 will share current equally. As the voltage at point S goes negative past the −1.1 volt level, transistor 22 will be turned off and the first holding transistor 12 will remain conducting. Therefore, it is apparent from the foregoing description that the noise immunity feature is provided by the biasing circuit means including the resistors 30 and 31 connected between the common output point 14 and the emitter supply voltage $V_{EE}$. In this biasing arrangement, an intermediate tap 34 is connected to the emitters 32 and 33 of transistors 22 and 23, respectively.

The J-K flip-flop of FIG. 1 further includes a pair of emitter-coupled transistors 41 and 42 having their emitter-base paths connected in parallel between the collector supply (ground potential) $V_{CC}$ and a common point 43. Input transistor 41 has a $\overline{J}$ terminal 44 connectable to a source of binary logic information ($\overline{J}$) and the input transistor 42 is connectable at terminal 45 to a source of clock signals $\overline{C}$. Similarly, a second pair of input transistors 48 and 49 have their emitter-collector paths connected in parallel between ground potential $V_{CC}$ and a common point 50. Input transistor 48 is connected to a source of binary information ($\overline{K}$) at terminal 51 and input transistor 49 is connectable to a clock source of $\overline{C}$ signals at base terminal 52.

The J-K flip-flop in FIG. 1 further includes the first and second lock-out transistors 56 and 57 respectively which have their emitter-collector paths connected in parallel with the emitter-collector paths of transistors 42 and 49, and the base electrodes 58 and 59 of the first and second lock-out transistors are connected to the base electrodes 36 and 35 respectively of the first and second holding transistors 12 and 13. Emitter resistors 63 and 64 are connected between common points 43 and 50 and emitter supply terminal 39, and first and second capacitors 65 and 66 couple the set and reset points S and R respectively to the emitter-coupled transistor pairs 41, 42 and 48, 49.

The remaining components of the schematic diagram in FIG. 1 will be described with reference to the function of the first and second current source transistors 67 and 68 which serve to rapidly discharge capacitors 65 and 66 during J-K operation. The following description of operation will further refer to first and second clamping transistors 70 and 71 which have their base terminals 73 and 74 connected to point 75 in order to insure proper temperature tracking in the circuit over a wide range of temperatures.

*Description of operation*

The circuit operation of FIG. 1 will be described with reference to the waveform diagrams in FIG. 2, and initially it will be assumed that point 7 is at zero volt and that point 8 is at −0.8 volt. For this condition, the second holding transistor 13 is conducting with −0.7 volt at the base electrode 35 and the first holding transistor 12 is non-conducting with −1.5 volts at the base electrode 36. The resistors 30 and 31 are selected such that point 14 is at approximately −1.4 volts and point 34 is at approximately −1.8 volts.

Initially, the first clamping transistor 70 is non-conducting and emitter 76 (and point S) is at approximately −1.3 volts or 0.6 volt below the −0.7 volt level at base terminal 73. The second clamping transistor 71 is initially conducting and the emitter 78 (and point R) is at approximately −1.4 volts or 0.7 volt below the 0.7 level at the base terminal 74. Therefore, there is a small voltage differential of 0.1 volt between points S and R in the circuit. This voltage differential results in small current flow through resistor 80 which is connected between the collectors 81 and 82 of the first and second current source transistors 67 and 68, respectively.

Referring to FIG. 2 of the $\overline{J}$ and $\overline{K}$ inputs at terminals 44 and 51 respectively are at −0.7 volt prior to time $t=0$, and the clock pulses $\overline{C}$ which vary between −0.7 volt and −1.5 volts do not change the state of the flip-flop. At time $t=0$, $\overline{J}$ and $\overline{K}$ drop to −1.5 volts, but with C at −0.7 volt the voltage at the common points 43 and 50 do not change. At time $t1$ however, $\overline{C}$ drops from −0.7 volt to −1.5 volts and this negative going transition is coupled through capacitor 65 to point S and drives point S negative to the −1.4 volt level shown. When the voltage level at point S reaches −1.4 volts, current from transistor 70 will discharge capacitor 65, but transistor 70 cannot respond fast enough to prevent capacitor 65 from charging during a finite period of time.

During the above charging and discharging of capacitor 65 and prior to time $t2$, the voltage at point R (−1.4 volts) remains unchanged since the −0.7 volt at the base of lock-out transistor 57 prevents capacitor 66 from seeing the clock transitions applied to the input terminal 52 of transistor 49. During the operation described above, the first current source transistor 67 is biased non-conducting with the base electrode 84 coupled through resistor 85 to the −1.5 volt potential at the base 58 of the first lock-out transistor 56. Resistor 85 and resistor 86 form a voltage divider network connected as shown between the base 58 of lock-out transistor 56 and the emitter supply $V_{EE}$. Prior to time $t2$ the second current source transistor 68 is conducting in the above-described operation with the base electrode 87 thereof coupled through resistor 88 to the −0.7 volt potential at the base electrode 59 of the second lock-out transistor 57. Resistor 88 and resistor 89 form a voltage divider network connected between the base of lock-out transistor 57 and the emitter supply voltage $V_{EE}$. A common emitter resistor 90 is connected between a common emitter point 91 and the supply voltage $V_{EE}$. With one or the other of the current source transistors 67 and 68 always conducting, the common point 91 is maintained at approximately −2.4 volts or −0.7 volt below the −1.7 volt level at intermediate tap 93 (transistor 68 conducting). With first current source transistor 67 non-conducting for the condition described above, the intermediate tap 94 is maintained at approximately −2.5 volts.

At time *t*2 the clock signal $\overline{C}$ rises from −1.5 volts to −0.7 volt, and this positive transition is coupled through capacitor 65, driving point S in a positive direction and turning on transistor 22. As previously explained, transistor 22 will become conductive when its base reaches the −1.1 volt level, and as transistor 22 is overdriven past the −1.1 level and up to approximately −0.9 volt (FIG. 2*c*), it hogs the current in the RS flip-flop portion 9. As this happens, point 7 in the circuit drops to approximately −0.8 volt, turning off second holding transistor 13 and allowing point 8 in the circuit to rise to ground potential. This brings the emitter of transistor 11 up to −0.7 volt and the voltage at intermediate tap 94 follows, turning on first current source transistor 67 to rapidly discharge capacitor 65 and drive point S down to approximately −1.45 volts. Thus, the current source transistor 67 has the effect of slightly negatively charging capacitor 65 once it is discharged back to its −1.4 volt level, but this slight negative charging or peaking down to approximately −1.45 volts does not adversely affect the rapid switching of the flip-flop.

Figures 2A, 2B, 2C, 2D, 2E, 2F:
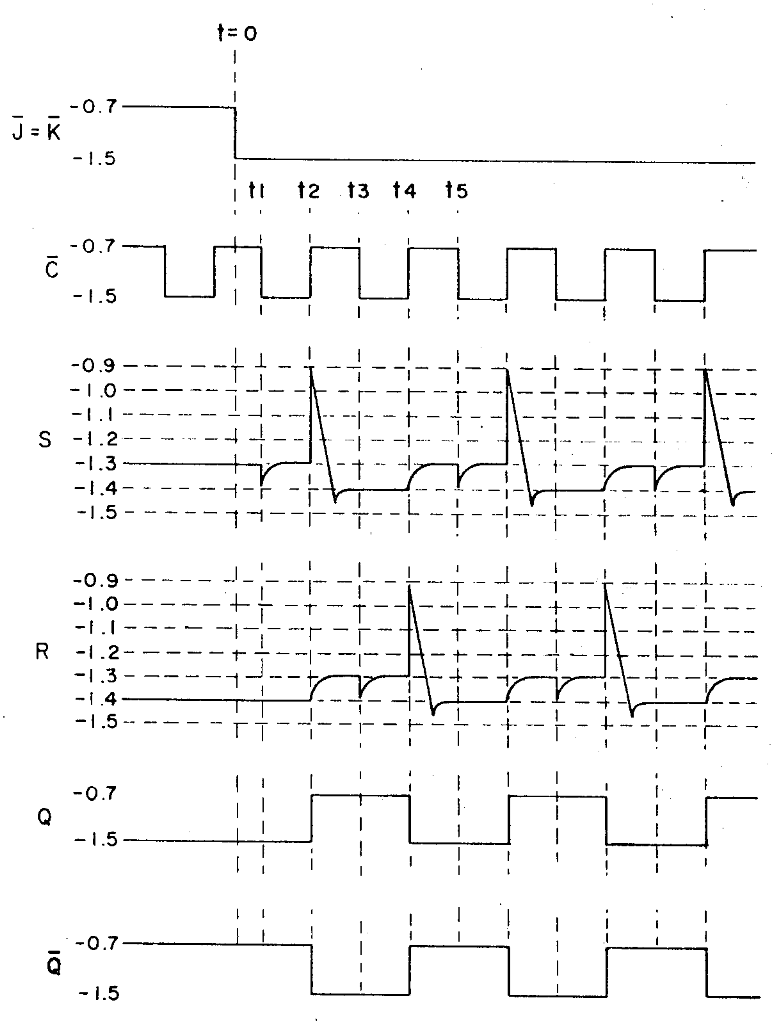

As the set-reset flip-flop portion 9 is switched from its SET state to its RESET state, the voltage at point R rises exponentially from −1.4 volts to −1.3 volts as transistor 71 is biased to a low conductive state this voltage change can be seen in FIG. 2*d* between times *t*2 and *t*3. At time *t*3 when $\overline{C}$ goes negative to −1.5 volts, the voltage at point R is driven momentadily down to the −1.4 volt level as point S had previously been so driven. The first lock-out transistor 56 which now has −0.7 volt on the base 58 thereof prevents capacitor 65 from seeing this clock transition and the voltage level at point S remains unchanged.

As point R is driven to −1.4 volts or −0.7 volt below the base of the second clamping transistor 71, this transistor is biased from a low to a high conducting state and provides a discharge current into capacitor 66. When $\overline{C}$ again rises to −0.7 volt at time *t*4, point R is driven positive to approximately −0.9 volt and the RS flip-flop is returned to its SET state.

The switching action described above is referred to as toggling. As long as the $\overline{J}$ and $\overline{K}$ inputs to terminals 44 and 51 remain at −1.5 volts (FIG. 2*a*), and as long as the clock pulses oscillate between −0.7 volt and −1.5 volts (FIG. 2*b*), the RS flip-flop 9 will alternately be switched from one to the other of its two stable states. Thus, upon the simultaneous application of logic (clock) signals to two different inputs of the flip-flop circuits in FIG. 1, the state of the flip-flop will always be determinate due to the above described toggling action.

The flip-flop in FIG. 1 further includes a pair of emitter-follower output transistors 95 and 96 which are connected respectively to the internal points 7 and 8 of the RS flip-flop 9. The $\overline{Q}$ and Q output terminals 97 and 98 are connected to the emitter-follower outputs of transistors 95 and 96 and, as seen FIGS. 2*e* and 2*f*, the $\overline{Q}$ and Q outputs are alternately driven between −0.7 volt and −1.5 volts (one diode drop below the voltage variations at points 7 and 8) during toggling operation. These output emitter-follower transistors 95 and 96 provide an extra degree of noise immunity during J-K operation which is not available when the $\overline{Q}$ and Q outputs are taken directly from the emitters of internal emitter follower transistors 10 and 11.

A voltage divider including resistors 99 and 100 is connected as shown with the intermediate tap 75 thereof connected to base terminals 73 and 74 of the first and second clamping transistors 70 and 71. A pair of temperature compensating diodes 101 and 102 are serially connected between resistor 100 and the emitter supply $V_{EE}$. These serially connected diodes 101 and 102 insure that the temperature induced voltage changes at intermediate tap 75 offset the termperature induced voltage variations at point 34 in the internal RS flip-flop section 9.

Thus, from the foregoing description it is apparent that the current source transistors 67 and 68 provide a minimum discharge time for capacitors 65 and 66 and allow the J-K flip-flop to be clocked at extremely high frequencies. When conventional resistors are used as a means for discharging capacitors 65 and 66, the frequencies at which the flip-flop can be clocked will be limited by the RC time constant of capacitors 65 and 66 and their respective discharge paths.

Additionally, the novel connection of the first and second lock-out transistors 56 and 57 render one of the two capacitors 65 and 66 insensitive to clock transitions in the non-set mode of the flip-flop, and this feature insures that one of the transistors 42 or 49 is locked out and prevents excessive charge build up on capacitors 65 and 66 respectively in the non-set mode of the flip-flop.

Thus, a J-K flip-flop has been described wherein current source and lock-out transistors are connected to prevent circuit capacitance from developing excessive charge storage either in the set or non-set mode of the flip-flop, and these features render the J-K flip-flop according to this invention particularly suitable for either high speed toggling or shift register operation.

Suitable circuit values for the J-K flip-flop circuit in FIG. 1 are given below by way of illustration as follows:

*Table of component values*

| Resistors: | Values in ohms |
|---|---|
| 17 | 210 |
| 20 | 210 |
| 30 | 75 |
| 31 | 875 |
| 63 | 1000 |
| 64 | 1000 |
| 80 | 2000 |
| 85 | 500 |
| 86 | 1500 |
| 88 | 500 |
| 89 | 1500 |
| 90 | 2000 |
| 99 | 425 |
| 100 | 2000 |
| 103 | 2000 |
| 104 | 2000 |

| Capacitors: | Values in micromicrofarads |
|---|---|
| 65 | 30 |
| 66 | 30 |

We claim:

1. In a bistable multivibrator having a set-reset flip-flop portion with set and reset input and output terminals, said multivibrator further including first and second input circuit means for receiving binary logic signals, in combination:

(a) a first capacitance means connected between said first input circuit means and said set input terminal and alternately charging to different levels of voltage as said set-reset flip-flop portion alternately changes from one conductive state to another, (b) a second capacitance means connected between said second input circuit means and said reset input terminal and alternately charging to different levels of voltage as said set-reset flip-flop portion alternately changes from one conductive state to another, (c) first current source means connected to said first capacitance means for rapidly discharging said first capacitance means when said set-reset flip-flop portion is being switched to one of its two stable states, and (d) second current source means connected to said second capacitance means for rapidly discharging said second capacitance means when said set-reset flip-flop portion is being switched to the other of its two stable states.

2. The multivibrator according to claim 1 wherein:

(a) said first and second input circuit means include respectively first and second parallel connected input transistor pairs for receiving binary logic signals, said first and second transistor pairs connected respectively to said first and second capacitance means, and (b) first and second lock-out transistors connected to said set-reset portion of said multivibrator and connected in parallel with said first and second transistor pairs respectively for alternately clamping said first and said second capacitance means and thereby rendering one of said first and second capacitance means insensitive to binary logic signals as said multivibrator is switched from one to the other of its two stable states.

3. A J-K bistable multivibrator having set and reset conductive states and including, in combination:

(a) a set-reset flip-flop portion having first and second signal output transistor portions and first and second holding transistor portions, means cross-coupling said first and second signal output transistor portions respectively to said first and second holding transistor portions and providing a current path through said set-reset flip-flop portion during the alternate conduction of said second and first holding transistor portions in the set and reset states of said flip-flop portion, set and reset input circuit means connected respectively to said first and second holding transistor portions, and including set and reset input terminals, (b) J and K input circuit means including first and second parallel connected input transistor pairs for receiving J and K binary logic information, (c) first and second capacitance means connected respectively between said first and second parallel connected input transistor pairs and said set and reset terminals of said flip-flop portion, (d) first current source means connected to said first capacitance means for rapidly discharging said first capacitance means when said flip-flop portion is switched to one of its two stable states, and (e) second current source means connected to said second capacitance means for rapidly discharging said second capacitance means when said flip-flop portion is switched to the other of its two stable states.

4. The multivibrator according to claim 3 which further includes:

(a) a first lock-out transistor connected in parallel with said first input transistor pair and connected to said first holding transistor for providing a clamping voltage at said first capacitance means and thereby rendering said first capacitance means insensitive to changes in the level of binary input logic information when said flip-flop portion is in one of its two stable states, and (b) a second lock-out transistor connected in parallel with said second input transistor pair and connected to said second holding transistor portion for providing a clamping voltage at said second capacitance means and thereby rendering said second capacitance means insensitive to binary input logic information when said flip-flop portion is in the other of its two stable states.

5. The multivibrator according to claim 4 which further includes:

(a) set and reset transistors connected in parallel respectively with said first and second holding transistors, and (b) bias circuit means connected to said first and second holding transistor portions and to said set and reset transistors for biasing said set and reset transistors at a predetermined voltage level so that said set and reset transistors will conduct and initiate a change in the conductive state of said multivibrator only in response to voltage levels at said set and reset transistors above a predetermined threshold level.

6. The multivibrator according to claim 5 wherein:

(a) said first current source means includes a first current source transistor connected between said first capacitance means and a potential supply terminal, (b) first resistive biasing means connected between first holding transistor portion and said potential supply terminal, said first resistive biasing means connected to said first current source transistor for biasing said first current source conducting to discharge said first capacitance means when the voltage level at said first holding transistor portion reaches a predetermined logical level, (c) said second current source means includes a second current source transistor connected between said second capacitance means and said potential supply terminal, and (d) second resistive biasing means connected between said second holding transistor and said potential supply terminal and further connected to said second current source transistor for biasing said second current source transistor into conduction to discharge said second capacitance means when the voltage at said second holding transistor portion reaches said predetermined logical level.

7. The multivibrator according to claim 6 which further includes:

(a) a first transistor connected between said set input terminal and a point of reference potential for clamping said set input terminal at a first voltage level when conducting and at a second voltage level when non-conducting during the alternate conduction of said first and second holding transistors, and (b) a second transistor connected between said reset input terminal and said point of reference potential for clamping said reset input terminal at said first voltage level when conducting and at said second voltage level when non-conducting during the alternate conduction of said first and second holding transistors.

8. The multivibrator circuit according to claim 7 which further includes:

(a) a first output emitter-follower transistor connected to said first signal output transistor portion for providing a binary output signal at one level of logic, and (b) a second output emitter-followed transistor connected to said second signal output transistor portion for providing a binary output signal at a second level of logic complementing said one level of logic.

References Cited

UNITED STATES PATENTS 3,178,584 4/1965 Clark -------------- 307—291

ARTHUR GAUSS, *Primary Examiner.*

J. ZAZWORSKY, *Assistant Examiner.*

Disclaimer 3,444,395.—*Philip B. Foster*, Phoenix, *Richard A. Gissel*, Tempe, and *Walter C. Seelbach*, Scottsdale, Ariz. J-K FLIP-FLOP. Patent dated May 13, 1969. Disclaimer filed May 19, 1972, by the assignee, *Motorola, Inc.*

Hereby enters this disclaimer to claims 1, 2, 3, 4, 5, 6, 7 and 8 of said patent.

[*Official Gazette December 5, 1972.*]